(12) United States Patent
Togasaka

(10) Patent No.: US 9,921,076 B2
(45) Date of Patent: Mar. 20, 2018

(54) DISPLAY CONTROL DEVICE

(71) Applicant: Techno Craft Corporation Ltd., Niigata-shi, Niigata (JP)

(72) Inventor: Masanari Togasaka, Niigata (JP)

(73) Assignee: Techno Craft Corporation Ltd., Niigata-shi, Niigata (JP)

(*) Notice: Subject to any disclaimer, the term of this patent is extended or adjusted under 35 U.S.C. 154(b) by 113 days.

(21) Appl. No.: 14/779,864

(22) PCT Filed: Jul. 12, 2013

(86) PCT No.: PCT/JP2013/069167
§ 371 (c)(1),
(2) Date: Sep. 24, 2015

(87) PCT Pub. No.: WO2015/004801
PCT Pub. Date: Jan. 15, 2015

(65) Prior Publication Data
US 2016/0109255 A1  Apr. 21, 2016

(51) Int. Cl.
*G01C 21/36* (2006.01)
*G01C 21/00* (2006.01)
(Continued)

(52) U.S. Cl.
CPC ....... *G01C 21/3667* (2013.01); *G01C 21/005* (2013.01); *G01C 21/08* (2013.01);
(Continued)

(58) Field of Classification Search
CPC .. G01C 21/005; G01C 21/08; G01C 21/3667; G09B 29/00; G09B 29/106; G01S 19/19
See application file for complete search history.

(56) References Cited

U.S. PATENT DOCUMENTS 7,713,148 B2 * 5/2010 Sweeney ............ A63B 24/0021
  273/317
2002/0038178 A1 * 3/2002 Talkenberg ........ A63B 24/0021
  701/532
(Continued)

FOREIGN PATENT DOCUMENTS

JP  2004-105350 A  4/2004
JP  2004309678 A  11/2004
(Continued)

OTHER PUBLICATIONS

International Search Report dated Aug. 13, 2013 in PCT/JP2013/069167.
European Search Report dated Mar. 24, 2017 in EP 13889197.3.

*Primary Examiner* — Jerrah Edwards
(74) *Attorney, Agent, or Firm* — Fox Rothschild LLP

(57) ABSTRACT

Provided is a display control device allowing the direction of a map information shown on a display to be correctly recognized. A display control unit displays on a display of a mobile terminal map information reproducing a scenery, thus making it possible to display on top of the map information a coordinate position display section corresponding to the current location of the mobile terminal. Here, there are provided a map information display determination section for displaying on the display the map information in a fixed orientation; and an angular difference display determination section for displaying on the display an angular difference between an angle of direction in which the mobile terminal is pointed and an angle of direction of the map information shown on the display.

8 Claims, 6 Drawing Sheets

(51) Int. Cl.
    *G01C 21/08*     (2006.01)
    *G09B 29/10*     (2006.01)
    *G01S 19/19*     (2010.01)
    *G01S 19/13*     (2010.01)

(52) U.S. Cl.
    CPC .............. *G01S 19/13* (2013.01); *G01S 19/19* (2013.01); *G09B 29/106* (2013.01)

(56) References Cited

U.S. PATENT DOCUMENTS

| | | | | |
|---|---|---|---|---|
| 2005/0101415 A1* | 5/2005 | Sweeney | ............ | A63B 24/0021 |
| | | | | 473/407 |
| 2009/0086015 A1* | 4/2009 | Larsen | ................... | F41G 3/165 |
| | | | | 348/46 |
| 2013/0085018 A1* | 4/2013 | Jensen | ................... | A63B 57/00 |
| | | | | 473/404 |

FOREIGN PATENT DOCUMENTS

| | | |
|---|---|---|
| JP | 2009-009546 A | 1/2009 |
| JP | 2009-291552 A | 12/2009 |
| JP | 2011-212419 A | 10/2011 |
| JP | 2011-258066 A | 12/2011 |
| JP | 2011-258223 A | 12/2011 |
| WO | 96/21161 A1 | 7/1996 |
| WO | 2009150504 A1 | 12/2009 |

\* cited by examiner

DISPLAY CONTROL DEVICE

CROSS-REFERENCE TO RELATED APPLICATIONS

This application is a § 371 U.S. National Stage Entry of International Application No. PCT/JP2013/069167, filed Jul. 12, 2013, the entirety of which is hereby incorporated herein by reference.

TECHNICAL FIELD

The present invention relates to a display control device that is installed in a user's mobile terminal such as a tablet or a smartphone, and is capable of displaying on a display of such mobile terminal an information about the user's location and direction in a manner such that this information is shown on top of a map information.

BACKGROUND ART

As a terminal device in which this type of display control device is installed, there are known those disclosed in the Patent documents 1 to 3, for example. Particularly, a map information depicting a teeing ground or a green, for instance, is shown on a display of a mobile terminal held by a golf player. Moreover, displayed on top of such map information are respectively an arc-like distance information and a directional straight line indicating the direction in which the mobile terminal is pointed, with a current location of the player being used as a starting point. Further, disclosed in other reference documents 4 to 6 is an idea of showing the range of the distance information in a fan-shaped figure.

PRIOR ART DOCUMENT

Patent Document

Patent document 1: JP-A-2009-291552
Patent document 2: JP-A-2011-258066
Patent document 3: JP-A-2011-212419
Patent document 4: JP-A-Hei 10-500883
Patent document 5: JP-A-2011-258223
Patent document 6: JP-A-2009-9546

SUMMARY OF THE INVENTION

Problem to be Solved by the Invention

According to the display control devices of the Patent documents 1 to 6, the map information is always shown on a screen of the display in a given direction such that a target corresponding to a target object such as a green can be displayed on an upper region of the display. This is because a troublesome processing procedure will have to be imposed on a control unit if rotating the map information shown on the display in accordance with the direction of the mobile terminal. However, if showing the map information at a fixed angle constantly, the direction of an actual course (field) and the direction of the map information shown on the display will not match with each other unless the player intentionally points the mobile terminal toward the direction of the green. That is, there has been a problem of incurring an unfavorable usability.

In order to solve such problem by matching the direction of the actual course with that of the map information shown on the display, there has known a method of pointing the mobile terminal through the directional straight line in a manner such that the front end of such directional straight line matches the direction of the green.

However, there has been the following dissatisfaction. That is, in a case where the map information is enlarged to display the same or when the location of an target object is not fixed but moves around, once the target has fallen out of a display area of the display, there is no way to tell in which direction should the directional straight line be pointed; and eventually in which direction the map information shown on the display is positioned with respect to an actual field.

In view of the aforementioned problems, it is an object of the present invention to provide a display control device allowing the direction of a map information shown on a display to be correctly recognized even when a target is outside a display area of the display.

Means to Solve the Problem

The present invention is a display control device for displaying on a display of a mobile terminal a map information reproducing a scenery, and then displaying on top of the map information a coordinate point corresponding to a current location of the mobile terminal every time the current location of the mobile terminal is obtained from a location detecting device as positioning data. Particularly, the invention includes: a map information display determination section for displaying the map information on the display in a fixed orientation; and an angular difference display determination section for displaying on the display an angular difference between an angle of direction in which the mobile terminal is pointed and an angle of direction of the map information displayed on the display, every time the angle of direction in which the mobile terminal is pointed is obtained from a direction detecting device as direction data.

Effects of the Invention

According to the invention of a first aspect, displayed in real time on the display of the mobile terminal is the angular difference indicating the extent by which the direction of the map information shown on the display is deviated from the direction in which the mobile terminal is pointed. Therefore, even when the target corresponding to a target object is outside the display area of the display, it is still possible to correctly learn the direction of the map information shown on the display with respect to an actual field.

According to the invention of a second aspect, the display of the mobile terminal displays the fixed line indicating the direction of the map information in an immovable manner; and, in real time, the variable line indicating the direction in which the mobile terminal is pointed. Thus, it is possible to intuitively learn the direction of the map information shown on the display with respect to an actual filed, based on the angle between the fixed line and the variable line.

According to the invention of a third aspect, when checking the current location of the mobile terminal on the map information, the location of the mobile terminal is displayed in a easily visible manner without being interfered by the point of intersection between the fixed line and the variable line that are shown on the display.

According to the invention of a fourth aspect, even when the fixed line is displayed in a manner that is not easily visible, by laying the variable line parallel to the side edge of the display, it is possible to easily match the direction of the map information on the display with that of an actual field.

According to the invention of a fifth aspect, in whichever direction the mobile terminal is pointed, the direction of an actual target object is shown in real time on the display. For this reason, even when the actual target object cannot be recognized through eyes, it is still possible to precisely learn the direction of the actual target object based on the contents shown on the display. Further, even when an actual field has become different from that shown in the map information at the time of disaster, the user holding the mobile terminal is able to reach to the target object at a shortest distance.

According to the invention of a sixth aspect, when the target is within the display area of the display, it is possible to correctly learn the distance from the current location of the mobile terminal to the target object through the arc-like distance information shown in real time on the display, by substantially matching the direction of the map information on the display and the direction of an actual field with other, and thus bringing the direction to the actual target object that is shown on the display toward the direction of the target on the map information. Further, by altering the orientation of the mobile terminal, it is possible to correctly learn the distance to an arbitrary location on the map information shown on the display.

According to the invention of a seventh aspect, the user is able to revise at his or her own will the location information of an actual target objet. Based on such revision(s), there can be displayed in real time on the display the direction to the actual target objet after the change(s) were made; and the distance information toward such target object.

According to the invention of an eighth aspect, while checking the condition of an actual field, by simply tapping a desired location on the map information shown in the same direction as such field on the display, the position of the target will move to the tapped location such that the location information of the actual target objet corresponding to the target can be easily revised.

MODE FOR CARRYING OUT THE INVENTION

An embodiment of the display control device of the present invention is described hereunder with reference to the accompanying drawings.

Figure 1:
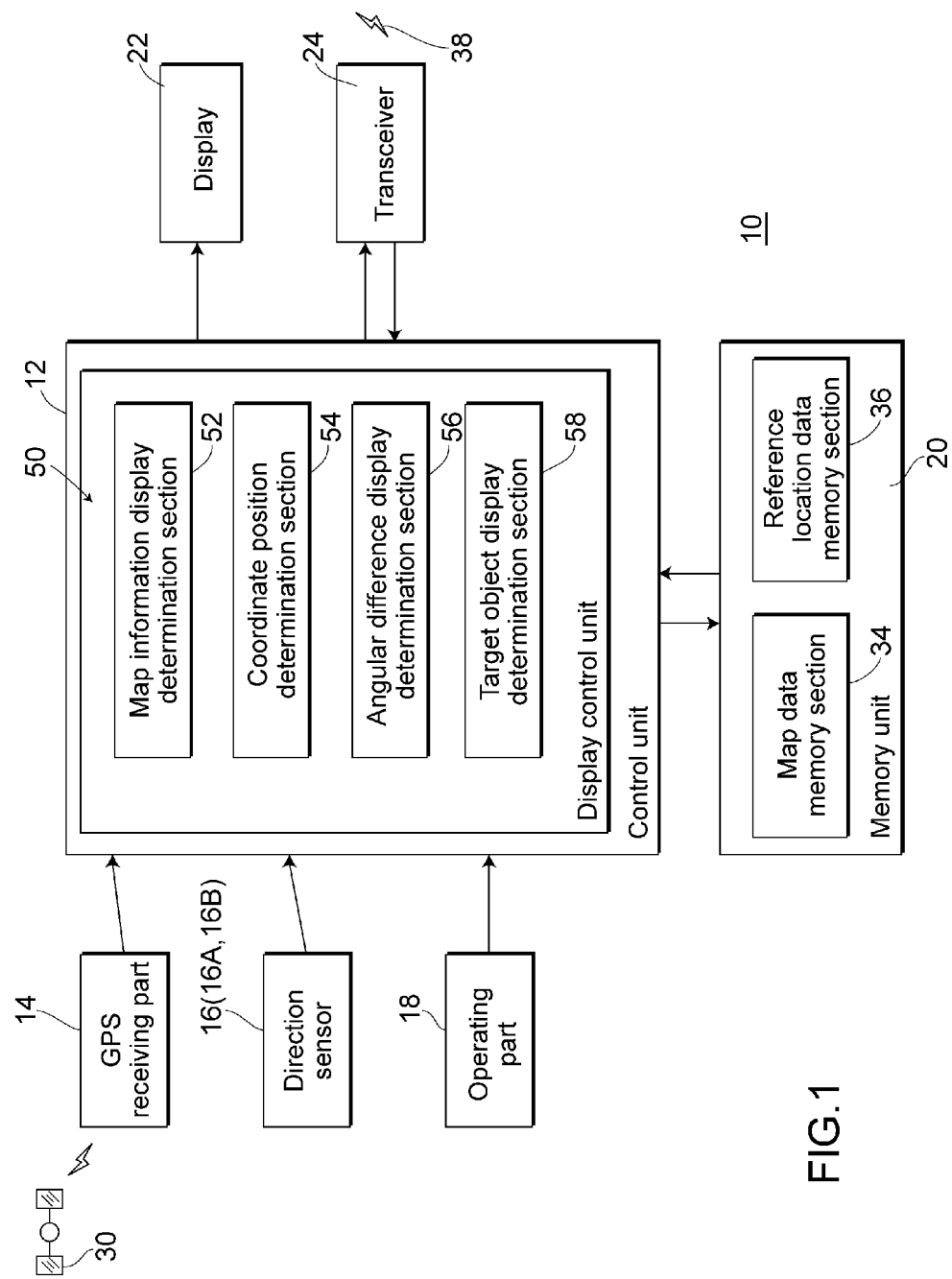
FIG. 1 is a block diagram showing an overall configuration of a mobile terminal in which a display control device of the present invention is installed.

FIG. 1 is an overall structural diagram showing a mobile terminal 10 equipped with a display control device 1 proposed by the present embodiment. In the beginning, described is the hardware configuration of the mobile terminal 10 held by a golf player as a user. The mobile terminal 10 includes a control unit 12, a Global Positioning System (GPS) receiving part 14, a direction sensor 16, an operating part 18, a memory unit 20, a display 22 and a transceiver 24. The mobile terminal 10 here is a smartphone formed into the shape of a thin rectangular plate and having a telephone function. Particularly, the mobile terminal 10 here can be operated by directly touching the surface of the display 22. However, the invention may also be used in other apparatuses such as a tablet terminal, a watch and a mobile information processing terminal.

The control unit 12 includes a Central Processing Unit (CPU), and has a software function for performing various types of arithmetic processing. This function is later described in detail.

The GPS receiving part 14 is installed as a location detecting device for obtaining a current location of the mobile terminal 10. The GPS receiving part 14 wirelessly receives radio waves from one or multiple satellites 30 such that the GPS receiving part 14 can measure a three-dimensional location (latitude, longitude and altitude) of the player holding the mobile terminal or phone 10, and then send such positioning data to the control unit 12. In fact, a location detecting device other than the GPS receiving part 14 can be used, as long as such device is able to detect the current location of the mobile terminal 10.

The direction sensor 16 is made up of a combination of an acceleration sensor 16A and a geomagnetic sensor 16B. The direction sensor 16 is installed as a direction detecting device for detecting an direction in which the mobile terminal 10 is pointed, and then sending such direction data to the control unit 12. Even in the case of such direction sensor 16, direction detecting devices other than the acceleration sensor 16A and the geomagnetic sensor 16B can be used, as long as such devices are able to obtain the direction in which the mobile terminal 10 is pointed.

The operating part 18 sends an electrical operation signal to the control unit 12 upon receiving a player's operation. Specifically, the operating part 18 can be made of a keyboard, a pointing device, a button(s) or the like other than a later-described transparent touch operating body mounted on the surface of the display 22. However, the operating part 18 is not limited to these devices.

The memory unit 20 is made up of various memory devices such as a magnetic hard disk device and a semiconductor memory device. The memory unit 20 includes a map data memory section 34 for storing a map data used to show a map information on the display 22; and a reference location data memory section 36 for storing, as a reference location data, the actual location information of each location determined in the map data. The memory unit 20 is able to read and write various data and programs including these map data and reference location data, based on the commands from the control unit 12.

According to the present embodiment, the map data stored in the map data memory section 34 is used to reproduce a scenery of a golf course as a display target, on the display 22 having a rectangular shape in a planar view.

Here, there are prepared multiple map data corresponding to each hole. Further, although not shown, a special GPS receiver, for example, is used to pre-calculate a three-dimensional location such as that of a tee or a green of each hole, in accordance with the map data. The positioning data thus calculated are then stored in the reference location data memory section 36 as the reference location data. Here, even when the display target is not a golf course, multiple reference location data are still to be stored in the reference location data memory section 36 as above, in accordance with the map data.

The display 22 shows various types of information upon receiving a display control signal from the control unit 12. For example, the display 22 is made up of a liquid crystal module or liquid crystal panel that is exposed on the front surface of a main body of the mobile terminal 10. As is known in the art, these liquid crystal module and liquid crystal panel display information through a dot matrix with a great number of subpixels being arranged in a grid pattern.

The transceiver 24 enables a bidirectional communication between the mobile terminal 10 and an external device (not shown) through a wired or wireless communication tool 38. In this way, only the required map and reference location data can be selectively retrieved into the control unit 12 from the transceiver 24 of the mobile terminal 10, after being fetched from, for example, a center server as an external device possessing a large amount of the map and reference location data through a communication tool 38 such as the Internet. The map and reference location data thus retrieved into the control unit 12 are further able to be stored in the map data memory section 34 and the reference location data memory section 36, respectively.

Described hereunder is a software configuration of a program for operating the control unit 12. The control unit 12 has a function of a display control unit 50 as a display control device for controlling the display on the display 22. The display control unit 50 includes a map information display determination section 52, a coordinate position determination section 54, an angular difference display determination section 56 and a target object display determination section 58. In short, the display control unit 50 here is stored as programs that can be read by the memory unit 20 as a storage medium. Particularly, the programs are executed by the control unit 12 having a function as a computer of the mobile terminal 10, and are performed through the map information display determination section 52, the coordinate position determination section 54, the angular difference display determination section 56 and the target object display determination section 58 in a successive manner.

The map information display determination section 52 serves to determine a reduction scale as a ratio between a distance (actual distance) between the reference location data of two locations that are obtained from the reference location data memory section 36; and a distance (image distance) between the coordinate data of the abovementioned two locations that are shown on the display 22. Further, the map information display determination section 52 is able to previously retrieve the map data of a particular hole from the map data memory section 34, based on, for example, an input from the operating part 18. The map information display determination section 52 then converts such map data into a map information that can be shown on the display 22, followed by sending such map information to the display 22. Moreover, when calculating the actual distance, the map information display determination section 52 selectively retrieves from the reference location data memory section 36 the reference location data of two locations that exist in the map data of the particular hole. At that time, the map information display determination section 52 determines the angle of direction of the map information to be shown on the display 22, and has the memory unit 20 store such angle of direction of the map information. Later, although the display 22 will show either an enlarged or reduced map information in accordance with the aforementioned reduced scale, such map information will always be shown in a fixed orientation based on the angle of direction determined.

The coordinate position determination section 54 serves to determine the coordinate position of the mobile terminal 10 in the map information shown on the display 22, based on the positioning data that shows the current location of the mobile terminal 10 and is obtained from the GPS receiving part 14; a particular reference location data obtained from the reference location data memory section 36 by the map information display determination section 52; and the reduced scale obtained at the map information display determination section 52. The GPS receiving part 14 periodically (e.g. every second) sends the positioning data to the display control unit 50, and the coordinate position determination section 54 accordingly determines the coordinate position of the mobile terminal 10 that is shown in the map information.

Every time the angular difference display determination section 56 obtains from the direction sensor 16 the angle of direction in which the mobile terminal 10 is pointed as the direction data, it will serve to show on the display 22 an angular difference between the angle of direction in which the mobile terminal 10 is pointed and an angle of direction of the map information that is obtained by converting the map data from the memory unit 20 into a particular scale and direction. Here, the direction sensor 16 periodically sends the direction data to the display control unit 50, and the angular difference display determination section 56 accordingly determines the angular difference to be shown on the display 22.

Every time the target object display determination section 58 obtains the positioning data from the GPS receiving part 14 and the direction data from the direction sensor 16, it will serve to show on the display 22 a direction from the mobile terminal 10 toward the actual green; and a determined distance (e.g. number of yards) from the mobile terminal 10 to the actual green in the form of an arc-like distance information, with the coordinate position of the mobile terminal 10 being regarded as the center. At that time, the direction of the mobile terminal 10 that is obtained from the direction data is taken into consideration, and there are also utilized the information of the current location of the mobile terminal 10 that is obtained from the positioning data; and the information of the location of an actual target object (e.g. green) that is obtained from one of the reference location data. A plurality of such arc-like figures can be generated in accordance with a difference in a designated distance. In fact, such arc-like figures are displayed in a semitransparent state when superimposed on the map information showing the scenery of each hole.

In the present embodiment, the information of the direction and distance to the actual target object are shown with the coordinate position of the mobile terminal 10 shown on the display 22 being used as a starting point. However, the information of the direction in which the mobile terminal 10 is pointed and the information of the distance toward such direction may be shown on the display 22, or the information of the direction and distance to a target on the map data that corresponds to an actual target object may be shown on the display 22, every time the direction data are obtained from the direction sensor 16.

Figure 2:
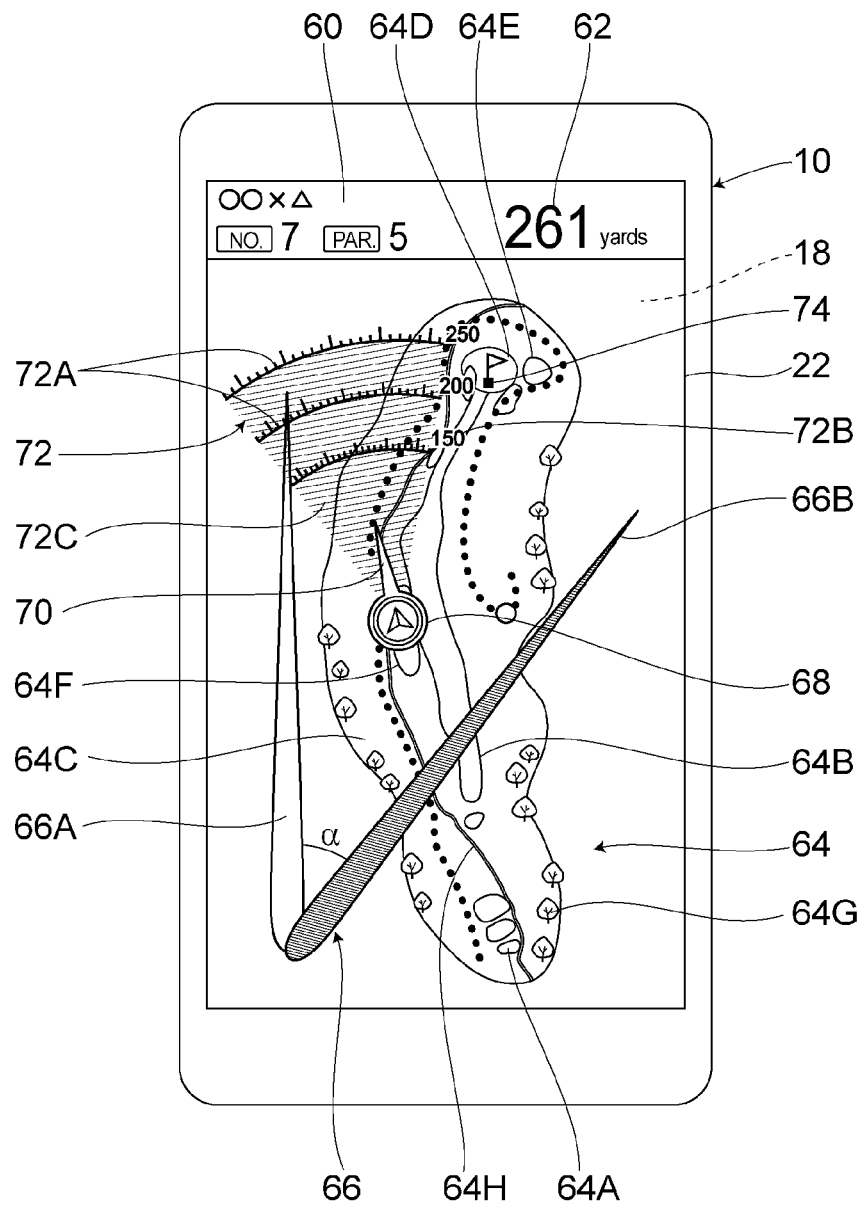
FIG. 2 is a planar view showing a display state on a display of the abovementioned mobile terminal.

FIG. 2 shows an example of a display configuration on the display 22. As shown in FIG. 2, the display 22 is equipped with the operating part 18 as a transparent touch panel mounted on the surface thereof. By touching a specific spot(s) on the surface of the display 22, an electric operation signal assigned to such spot(s) will be retrieved into the control unit 12 from the operating part 18.

The display 22 here includes a hole information display section 60 and a yard display section 62 that are located in the upper region of such display 22. Further, located therebelow are, for example, a map information display section 64, an adjustment line display section 66, a coordinate position display section 68, a target object direction display section 70, a distance information display section 72 and a target location display section 74. All the displays on the display 22 are effected by the display control signal sent to the display 22 from the display control unit 50.

The hole information display section 60 shows the name of the hole displayed in the map information display section 64; and a hole and par numbers. These are shown as hole information, and are stored in the memory unit 20 in connection with the map data of each hole. Further, these hole information are to be read out by the display control unit 50 from the memory unit 20, when the map information of a particular hole is displayed in the map information display section 64.

The yard display section 62 shows the remaining yards from the current location of the mobile terminal 10 to the actual green. Here, the remaining yards shown in the yard display section 62 are updated every time the positioning data is sent to the display control unit 50 from the GPS receiving part 14.

The map information display section 64 serves to display a map information by reproducing the scenery of a hole. This type of map information is obtained as follows. That is, the map information display determination section 52 reads out a particular map data from the map data stored in the map data memory section 34. Such particular map data corresponding to an actual hole are then converted into a proper scale and direction in a manner such that the one entire hole can be shown within a display area of the map information display section 64. The map information shown here include, for example, Tee 64A, Fairway 64B, Rough 64C, Green 64D, Bunker 64E, Pond 64F, Forest 64G and Cart road 64H.

The adjustment line display section 66 shows on the display 22 an angle α between a linear needle-like fixed line 66A indicating the direction of the map information; and a linear needle-like variable line 66B indicating the direction of the mobile terminal 10. Here, the angle α is shown as an angular difference between the direction of the map information and the direction of the mobile terminal 10. The fixed line 66A is always parallel to a side edge of the display 22; whereas the variable line 66B is updated to a direction determined in accordance with the angular difference a with the base end of the fixed line 66A being used as a starting point, every time the angular difference display determination section 56 retrieves the direction data from the direction sensor 16. Further, a point of intersection between the fixed line 66A and the variable line 66B is shown in a position other than the coordinate position corresponding to the current location of the mobile terminal 10. The angular difference a may also be indicated in an other format such as a number or a bar graph. That is, the indication of the angular difference a is not limited to that of the fixed line 66A and the variable line 66B which compose the adjustment line of the present embodiment.

The coordinate position display section 68 serves to show in the map information display section 64 the coordinate position (coordinate point) of the current location of the mobile terminal 10 that has been determined by the coordinate position determination section 54. Here, the position of the coordinate position display section 68 shown on the display 22 is updated every time the positioning data is sent to the coordinate position determination section 54 from the GPS receiving part 14.

The target object direction display section 70 serves to show in the map information display section 64 the direction of the mobile terminal 10 toward the actual green. Particularly, this direction is determined by the target object display determination section 58 with the abovementioned coordinate position being used as a starting point. More particularly, such direction is indicated by a linear needle-like shape. Here, the direction of the target object direction display section 70 shown on the display 22 is updated every time the positioning data and the direction data are sent to the target object display determination section 58 from the GPS receiving part 14 and the direction sensor 16, respectively.

The distance information display section 72 displays on top of the map information display section 64 the arc-like distance information indicating the distance from the coordinate position display section 68 toward the actual green, the coordinate position display section 68 being used as a starting point accordingly. Here, the distance information displayed by the target object display determination section 58 include, for example, multiple arc-like lines 72A drawn at a given interval from the coordinate position display section 68 toward the direction of the target object direction display section 70; numbers of yards 72B indicating the distances from the target object display determination section 58 with respect to each ark-like line 72A; and a semitransparent region 72C displayed in a semitransparent manner so as to identify the range of the player's view by making the map information display section 64 visible in a range defined by the left and right ends of the arc-like lines 72A. Especially, in the present embodiment, the multiple arc-like lines 72A and the numbers of yards 72B allow there to be learned simultaneously not only the locations of and the distances to the fairway 64B and the green 64D, but also the locations of and the distances to the hazards such as the bunker 64E, the pond 64F and the forest 64G, by simply pointing the mobile terminal 10 to an arbitrary direction.

The target location display section 74 serves to show a target on the map information based on an actual target object. The way by which the target is displayed is not limited to that of a simple figure. In fact, the target here may also be shown through a still or animation image; or an AR (Augmented Reality) display. The target location display section 74 is not necessarily shown all the time. For example, the target location display section 74 may even move outside the display area of the display 22 at the time of enlarging the map information. Further, a green is set by default as the actual target object such that the target location display section 74 coincides with the location of the green 64D. However, by tapping the operating part 18 disposed on the surface of the display 22, the actual target object can be changed to that in the tapped location on the map information.

In addition, although not shown in FIG. 2, there may also be displayed the location or driving status of a cart (not shown) carrying the player. The information of such location or driving status of the cart are to be retrieved into the display control unit 50 from a center server through the communication tool 38, the center server keeping track of the service statuses of all the carts that are in service on the golf course.

Figure 3:
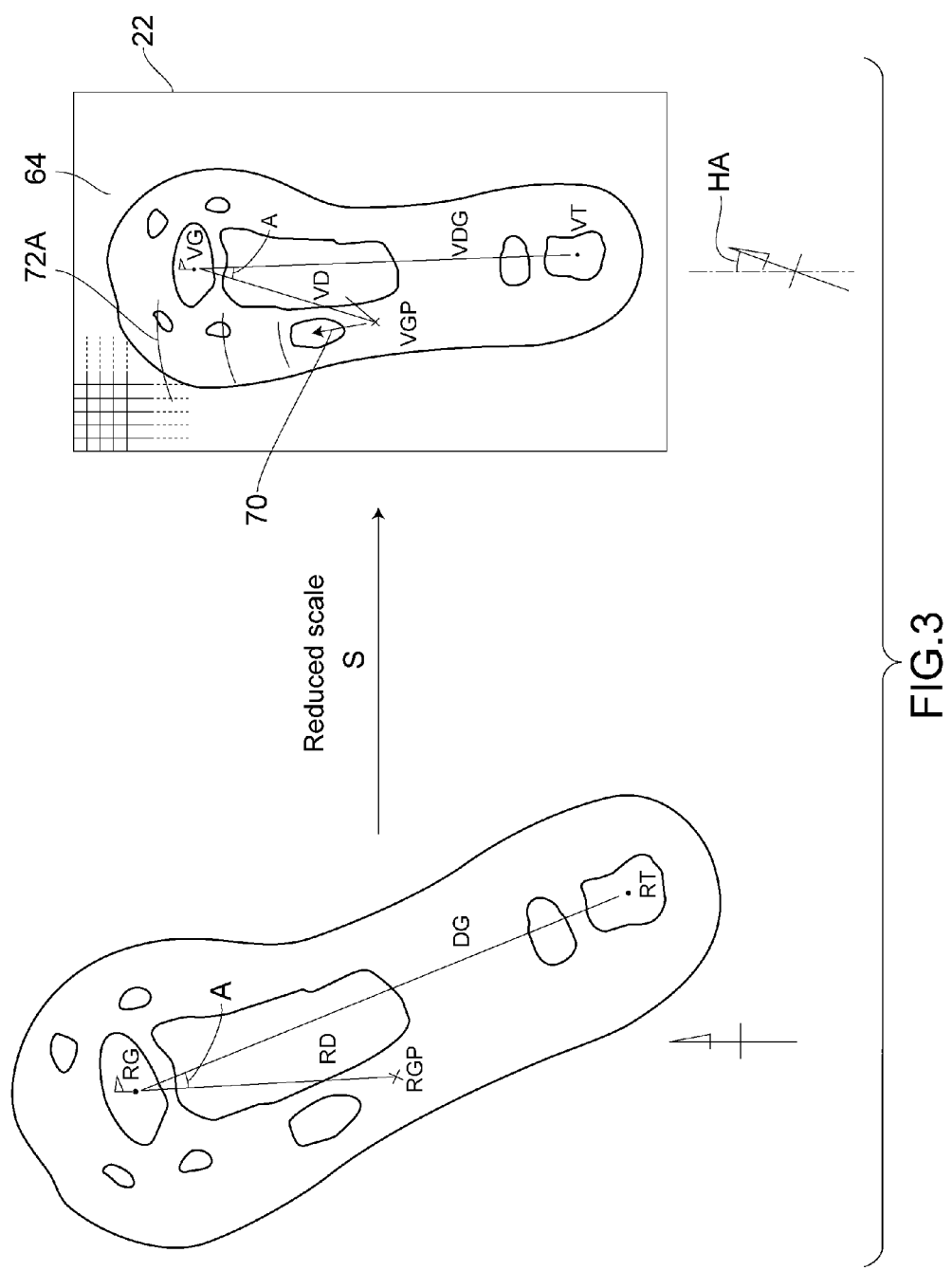
FIG. 3 is a planar schematic view illustrating an actual course and a map information shown on the display, for the purpose of explaining the operation of the abovementioned mobile terminal shown in FIG. 1.
Figure 4:
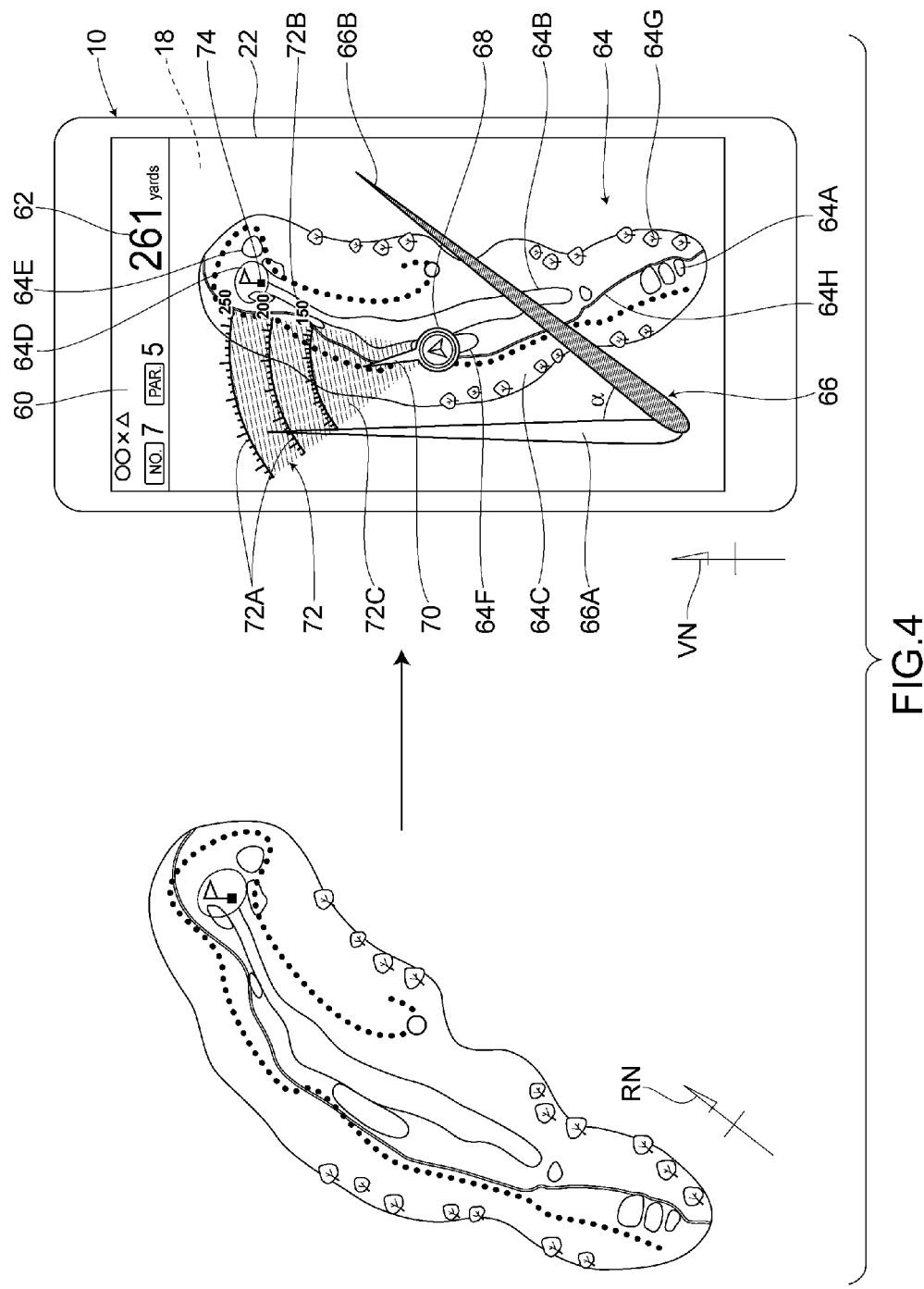
FIG. 4 is a planar schematic view illustrating the actual course and the map information shown on the display when the directions of the actual course and the map information do not match with each other, for the purpose of explaining the operation of the abovementioned mobile terminal shown in FIG. 1.
Figure 5:
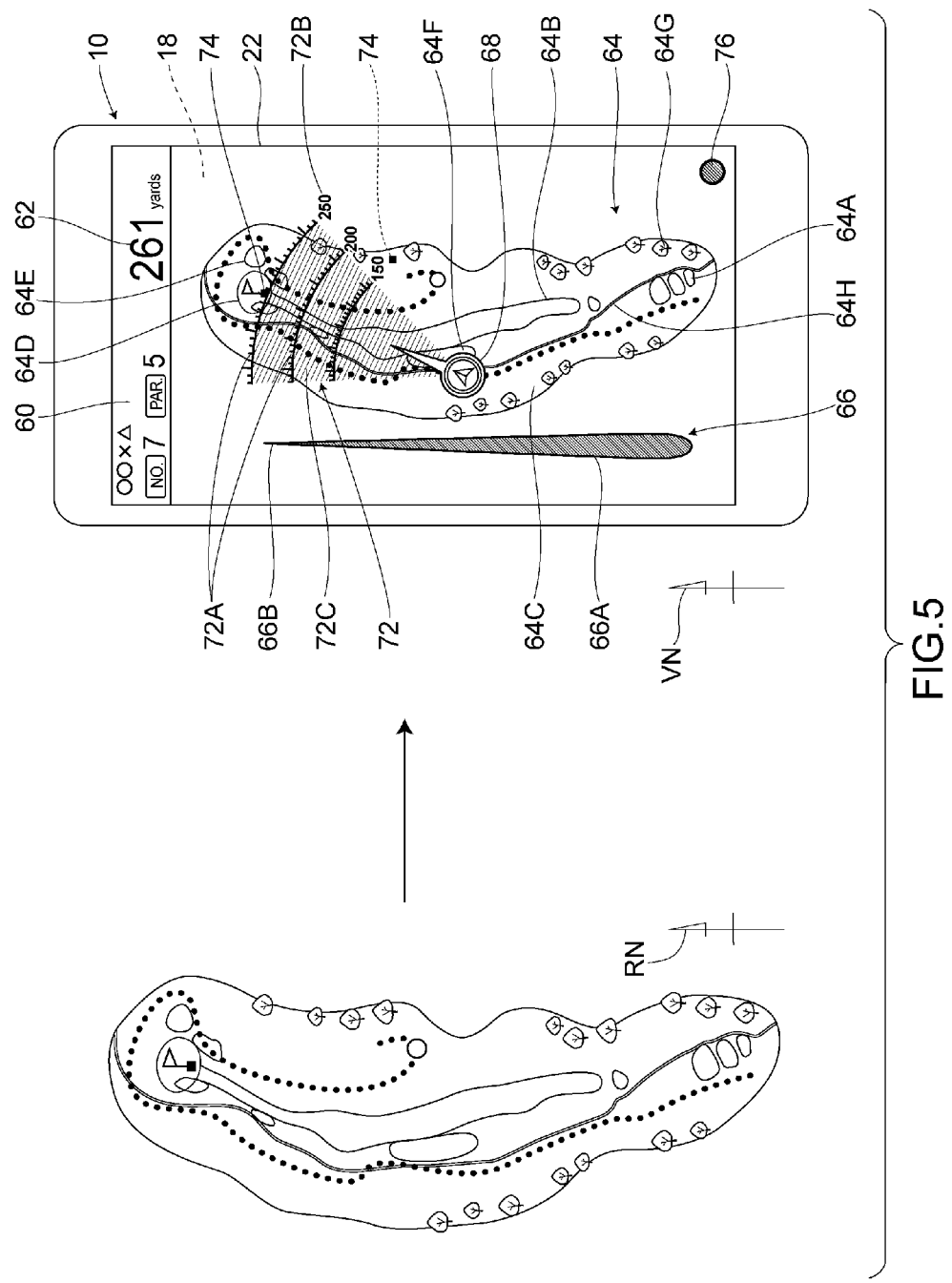
FIG. 5 is a planar schematic view illustrating the actual course and the map information shown on the display when the directions of the actual course and the map information have matched with each other, for the purpose of explaining the operation of the abovementioned mobile terminal shown in FIG. 1.
Figure 6:
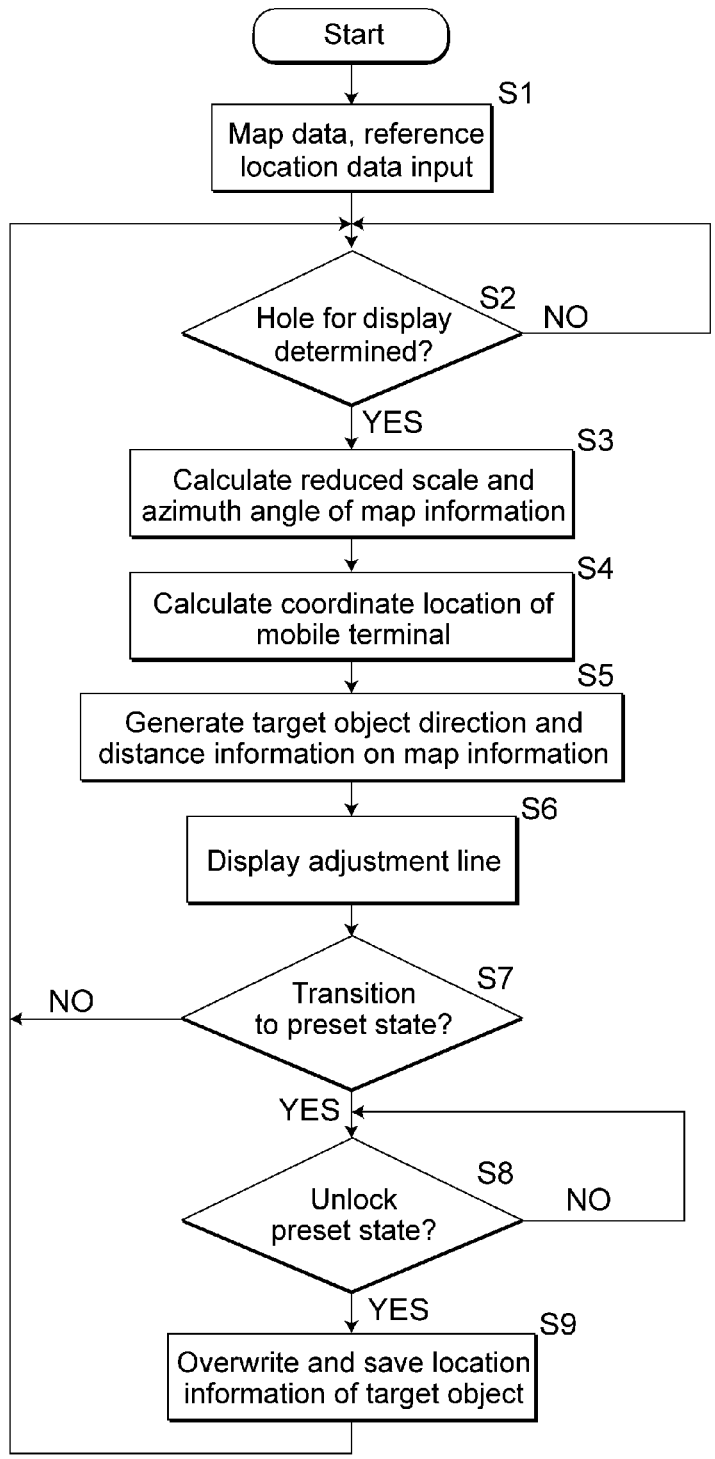
FIG. 6 is a flow chart explaining the operation of the abovementioned mobile terminal shown in FIG. 1.

Next, the functions of the aforementioned configuration are described based on a flow chart shown in FIG. 6, and with reference to the explanatory diagrams of FIG. 3 to FIG. 5.

As shown in a step S1 in FIG. 6, latitudes and longitudes such as those of tee RT and green RG of an actual hole that are previously measured by a special GPS receiver, are to be stored in the reference location data memory section 36 of the mobile terminal 10 held by the player, as the reference location data. Further, map data containing such reference location data and capable of reproducing an actual scenery, are to be stored in the map data memory section 34.

In the next step S2, the display control unit 50 determines a hole to be displayed in the map information display section 64 on the display 22. This may be carried out by first identifying the current location of the mobile terminal 10 based on the positioning data obtained from the GPS receiving part 14, and then comparing such current location with the reference location data to determine a hole closest to the current location of the mobile terminal 10; or the hole may be alternatively determined based on the operation signal from the operating part 18.

At the display control unit 50, once the hole to be shown on the display 22 has been determined, the map information display determination section 52 will read out the map data and reference location data of this particular hole from the map data memory section 34 and the reference location data memory section 36, respectively, and then calculate the reduced scale and angle of direction of the map information to be shown in the map information display section 64 on the display 22 (step S3).

As shown in FIG. 3, an actual distance DG between the tee RT and the green RG is calculated based on the reference location data of both the tee RT and the green RG that have been read out from the reference location data memory section 36. Next, the map data of the particular hole to be shown that have been read out from the map data memory section 34, are to be shown in a manner such that the captioned map data be displayed within the display area of the distance information display section 72 on the display 22. At that time, based on the actual tee RT and the green RG, for example, obtained are the coordinates of a tee VT and a green VG in the images of the map information and the distance information display section 72. Further, an image distance VDG between the tee VT and the green VG are calculated thereafter, and a ratio of such image distance VDG to the actual distance DG is then calculated as a reduced scale S. Furthermore, the angle (angle of direction) HA of the map information shown in the distance information display section 72 is calculated based on the locations of the actual tee RT and the green RG, for example. In this way, once the reduced scale S and the angle HA of the map information have been determined by the map information display determination section 52, the captioned map information will be shown in the map information display section 64 on the display 22, and the next step S4 will then take place.

In the step S4, the coordinate position determination section 54 determines the coordinate position of the mobile terminal 10 to be shown on the display 22. As shown in FIG. 3, the current location (latitude, longitude) RGP of the mobile terminal 10 is obtained based on the positioning data from the GPS receiving part 14. An actual distance RD between the green RG and the current location RGP of the mobile terminal 10, for example, is then calculated based on the reference location data used in the step S3, and a distance VD from the green VG in the map information of the map information display section 64 is further calculated based on such actual distance RD. In addition, there is calculated an angle A defined by a line connecting the location of the tee RT and the location of the green RG; and a line connecting the location of the green RG and the current location RGP of the mobile terminal 10. A coordinate VGP of the mobile terminal 10 in the images is then calculated based on the angle A and the distance VD from the green VG in the images. Such coordinate VGP is shown as the coordinate position display section 68. Once the coordinate position determination section 54 has determined the coordinate VGP, the next step S5 will take place.

As shown in a step S5, the target object display determination section 58 displays on the display 22 the direction form the mobile terminal 10 toward a green as an actual target object and the distance information toward such direction, the direction and distance information being shown on top of the map information corresponding to the map data. As shown in FIG. 3, with the current location RGP of the mobile terminal 10 being used as a starting point, an angle of direction of the actual green RG is calculated based on the location of the actual green RG obtained in the step S4 and the current location RGP of the mobile terminal 10. Also, the direction data are obtained from the direction sensor 16 to identify the angle of direction of the mobile terminal 10. In this way, with the coordinate position display section 68 being used as a starting point, the target object direction display section 70 can be shown in the map information display section 64 in a manner such that the target object direction display section 70 always points to the direction of the actual green RG regardless of the direction of the mobile terminal 10. Further, other than the target object direction display section 70, the target object display determination section 58 also displays in the map information display section 64 the arc-like lines 72A as the distance information toward the direction of the actual green RG, the arc-like lines 72A representing given distances (number of yards).

That is, the display control unit 50 of the present embodiment is configured as follows. Specifically, the display control unit 50 obtains the angle of direction in which the mobile terminal 10 is pointed based on the direction data from the direction sensor 16; and the current location (latitude, longitude) of the mobile terminal 10 based on the positioning data from the GPS receiving part 14. Based on these angle of direction and current location; the map data stored in the map data memory section 34; and the location data of the target object that are stored in the reference location data memory section 36, the display control unit 50 then draws, on the course image as the map information shown in the map information display section 64 on the display 22, the target object direction display section 70 as the direction toward an actual target object and the fan-shaped radar display of the distance information display section 72 toward an actual target object. Therefore, the player (golfer) holding the mobile terminal 10 is capable of precisely recognizing the existence of an actual target object in the direction shown in the map information display section 64, even when the green as the actual target object is not visible. Further, by altering the orientation of the mobile terminal 10, the distance information display section 72 can be shown in an arbitrary direction centering around the coordinate position display section 68. Thus, it is possible to learn a distance toward any point on the map information from the current location of the mobile terminal 10.

In a step S6 following the step S5, the angular difference display determination section 56 displays on the display 22 an angular difference between the direction of an actual course and the direction of the map information shown in the map information display section 64, as the adjustment line display section 66 composed of the fixed line 66A and the variable line 66B.

FIG. 4 shows a display configuration of the display 22 where a direction RN of an actual course (e.g. northward direction) does not match a direction VN of the map information shown in the map information display section 64. FIG. 5 shows a display configuration of the display 22 where the direction RN of an actual course matches the direction VN of the map information. The angular difference display determination section 56 identifies the angle of direction in which the mobile terminal 10 is pointed based on the direction data obtained from the direction sensor 16, and reads out the angle of direction of the map information stored in the memory unit 20, thereby making it possible to show on the display 22 the angular difference between the direction of the map information and the direction of the mobile terminal 10 as the angle α that is defined by the fixed and variable lines 66A and 66B of the adjustment line display section 66. In the present embodiment, regardless of whether or not the target location display section 74 corresponding to an actual target object is within the display area of the display 22, there will be shown in real time through the adjustment line display section 66 the angular difference indicating the extent by which the direction of the map information shown on the display 22 is deviated from the direction in which the mobile terminal 10 is pointed.

As shown in FIG. 5, the display control unit 50 will display a preset display section 76 on the display 22, when the direction RN of an actual course has matched the direction VN of the map information shown on the display 22 as a result of adjusting the orientation of the mobile terminal 10 to lay the variable line 66B on top of the fixed line 66A. Here, in a step S7, by touching the preset display section 76 shown on the operating part 18, the display control unit 50 will make a transition to a preset state, and allows changes to be made to the location information of an actual target objet that is stored in the reference location data memory section 36 as a reference location data. In the preset state, all indications except the target location display section 74 are fixed; and by tapping an arbitrary location in the map information, the target location display section 74 will move to the tapped location (see the symbol "74" indicated by a dashed line in FIG. 5). The target location display section 74 is able to move only when the angle α between the fixed and variable lines 66A and 66B has fallen into a given range and the variable line 66B has then lied on top of the fixed line 66A on the display. The target location display section 74 does not move on its own under other circumstances by tapping the operating part 18.

Next, in a step S8, once the preset state has been unlocked by retouching the preset display section 76 shown on the operating part 18, the display control unit 50 will calculate the location information of an actual target object corresponding to a new target location display section 74, and save such location information to the reference location data memory section 36 (step S9) before returning to the step S2. From that time forth, the target object display determination section 58, in the step S5, will display through the target object direction display section 70 the direction of an actual target object corresponding to a new target location display section 74; and display through the distance information display section 72 a distance information indicating the distance to such target object.

That is, in the present embodiment, the display control unit 50 as a display control device serves to show on the display 22 of the mobile terminal 10 the map information through which a scenery is reproduced. Moreover, the display control unit 50 obtains from the GPS receiving part 14 as a location detecting device the current location of the mobile terminal 10 as the positioning data, and then displays on the display 22 the coordinate position display section 68 as the coordinates corresponding to the current location of the mobile terminal 10 in a manner such that the coordinate position display section 68 is to be laid on top of the map information. In addition, the display control unit 50 has the map information display determination section 52 for showing on the display 22 the map information in a fixed orientation; and the angular difference display determination section 56 for showing on the display 22 the angle α as the angular difference between the angle of direction in which the mobile terminal 10 is pointed and the angle of direction of the map information shown on the display 22, every time the angle of direction in which the mobile terminal 10 is pointed is obtained as the direction data from the direction sensor 16 as a direction detecting device.

In this case, displayed in real time on the display 22 of the mobile terminal 10 is the angle α between the fixed and variable lines 66A and 66B of the adjustment line display section 66, the angle α being the angular difference indicating the extent by which the direction of the map information shown on the display 22 deviates from the direction in which the mobile terminal 10 is pointed. For this reason, even when the target location display section 74 corresponding to an actual target object is outside the display area of the display 22, it is still possible to correctly learn in which direction the map information shown on the display 22 is positioned with respect to an actual course (field).

Further, the angular difference display determination section 56 here is configured to display the angle α between the fixed line 66A indicating the direction of the map information and the variable line 66B indicating the direction of the mobile terminal, as the angular difference between the angle of direction in which the mobile terminal 10 is pointed and the angle of direction of the map information shown on the display 22.

In this case, while the fixed line 66A indicating the direction of the map information is displayed in an immovable manner on the display 22 of the mobile terminal 10, the variable line 66B indicating the direction in which the mobile terminal 10 is pointed is displayed in real time thereon. Therefore, based on the angle between the fixed line 66A and the variable line 66B, it is possible to intuitively learn in which direction the map information shown on the display 22 is positioned with respect to an actual course.

Moreover, the angular difference display determination section 56 is configured to display the point of intersection between the fixed line 66A and the variable line 66B in a spot other than that of the coordinate position display section 68.

In this case, when checking the current location of the mobile terminal 10 in the map information, the current location of the mobile terminal 10 can be displayed in an easily visible manner without being interfered by the point of intersection between the fixed and variable lines 66A and 66B that are shown on the display 22.

Further, the angular difference display determination section 56 is configured to display the fixed line 66A in the manner such that the fixed line 66A is parallel to the side edge of the rectangularly-shaped display 22.

In this case, even when the indication of the fixed line is not easily visible, the direction of the map information on the display and the direction of an actual field can be easily matched with each other by adjusting the variable line such that the variable line becomes parallel to the side edge of the display.

Further, in the present embodiment, there is employed the target object display determination section 58 for displaying on the display 22 the direction from the mobile terminal 10 toward an actual target object, with the coordinate position display section 68 being regarded as the center. Specifically, such direction from the mobile terminal 10 toward the actual target object is displayed based on the angle of direction in which the mobile terminal 10 is pointed, the current location of the mobile terminal 10 and the location information of the actual target object that has been read out from the reference location data memory section 36, every time the location data and the positioning data are obtained from the direction sensor 16 and the GPS receiving part 14, respectively.

In this case, the direction to an actual target object is shown in real time on the display 22, regardless of the direction in which the mobile terminal 10 is pointed. Therefore, even when the actual target object is not visible, it is possible to precisely learn the direction to the actual target object based on the contents displayed on the display 22. In addition, even when an actual field has become different from that shown in the map information at the time of disaster, the user holding the mobile terminal 10 is able to reach to the target object at a shortest distance.

Further, the target object display determination section 58 here is configured to display on the display 22 the direction to the actual target object; and the distance information display section 72 as the type of distance information having the arc-like shape and indicating the given distances from the mobile terminal toward the actual target object.

In this case, when the target location display section 74 is within the display area of the display 22, by substantially matching the direction of the map information on the display 22 and the direction of an actual course (field) with each other, and then by turning the direction facing the actual target object that is displayed on the display 22 in the direction of the target location display section 74 in the map information, it is possible to correctly learn the distance from the current location of the mobile terminal 10 to the target object based on the arc-like distance information display section 72 displayed in real time on the display 22. Further, by altering the orientation of the mobile terminal 10, it is possible to correctly learn, through the distance information display section 72, the distance to an arbitrary location in the map information displayed on the display 22.

Moreover, the target object display determination section 58 is configured to allow the location information of an actual target object to be revised by operating the operating part 18.

In this case, the user is able to revise at his or her own will the set location information of an actual target objet. Based on such revision(s), the target object display determination section 58 can then display in real time on the display 22 the direction to the actual target objet after such revision(s) were made; and the distance information toward such target object.

Further, the target object display determination section 58 here is configured to allow the location information of an actual target object that is stored in the reference location data memory section 36 to be revised (overwrite update) by tapping the operating part 18 on the display 22, when the angle of direction in which the mobile terminal 10 is pointed and the angle of direction in the map information shown on the display 22 have become identical to each other.

In this case, while checking the condition of an actual hole, by simply touching a desired location on the map information shown in the same direction as such hole on the display 22, the position of the target location display section 74 will move to the tapped location such that the location information of the actual target objet corresponding to the target can be easily revised.

As other effects, although not graphically shown in the present embodiment, the distance information display section 72 shown on the display 22 may further include a boundary line connecting the coordinate position display section 68 and a point on an arc-like line 72A. That is, there may be added a function where a boundary line 72M corresponding to the radius of the arc is displayed in a wiper-like manner such that the boundary line is able to repeatedly swing left and right within a range defined by the two ends of the arc-like line 72A.

Here, the distance information is to be displayed in a wiper-like manner where the boundary line 72M connecting a coordinate point 72J and a point on an arc-like line 72L moves within a range defined by the semitransparent region 72C and the two ends of the arc-like line 72L. In such case, the player can acquire a realistic feeling as if the current location of the mobile terminal 10 is in the coordinate position display section 68.

Also, the target object display determination section 58 may display the distance information in a wiper-like manner where the boundary line is allowed to repeatedly move left and right. Due to the boundary line moving to and from the left and right sides within the range defined by the two ends of the arc-like line 72A, the player can acquire the realistic feeling as if the current location of the mobile terminal 10 is in the coordinate position display section 68.

Alternatively, the target object display determination section 58 may also display the distance information in a wiper-like manner where the boundary line repeatedly moves toward one direction. Due to the boundary line moving in one direction which is either from the right side to the left side or from the left side to the right side within the range defined by the two ends of the arc-like line 72A, the player can acquire the realistic feeling as if the current location of the mobile terminal 10 is in the coordinate position display section 68.

Moreover, the target object display determination section 58 may also be configured in a way such that the boundary line is allowed to start moving in synchronization with the acquisition(s) of either one or both of the positioning data from the GPS receiving part 14 and the direction data from the direction sensor 16. In this way, every time the boundary line starts moving, it can be understood that new positioning data and direction data have been retrieved into the display control unit 50, and the operation status of the display control device can thus be confirmed intuitively through eyes.

Further, the target object display determination section 58 may also be configured in a way such that an area in the semitransparent region 72C where the boundary line exists is displayed thicker than other areas, and the semitransparent region 72C gradually turns thinner as the boundary line moves away therefrom.

In this case, the trajectory of the moving boundary line can be highlighted in the distance information display section 72 shown on the display 22, thereby providing the player with a type of distance information that is easily visible.

The target object display determination section 58 of the present embodiment has the function of displaying the target object direction display section 70 and the variable line 66B of the adjustment line display section 66, in synchronization with the acquisitions of the positioning data from the GPS receiving part 14 and the direction data from the direction sensor 16. Here, every time the target object direction display section 70 and the variable line 66B are shown on the display 22, it can be understood that new positioning data and direction data have been retrieved into the display control unit 50, and the operation status of the display control device can thus be confirmed intuitively through eyes.

Further, the target object display determination section 58 of the present embodiment has the function of displaying the semitransparent region 72C of the distance information display section 72 with the needle-like or arrow-like target object direction display section 70 being regarded as the center. Particularly, the semitransparent region 72C covers a range equiangularly extending from the target object direction display section 70 toward the left and right sides. Here, it is possible to intuitively learn from the distance information shown on the display 22 the kind of a target objet and the distance to such target object within a given angular range with the direction in which the mobile terminal 10 is pointed being regarded as the center.

Further, the target object display determination section 58 of the present embodiment has the function of displaying the needle-like or arrow-like target object direction display section 70 in a manner such that the base end of the target object direction display section 70 matches the coordinate position display section 68. In such case, the user is able to correctly learn the direction of an actual target object with a feeling as if the current location of the mobile terminal 10 is at the base end of a direction indicator 72K serving as an arrow.

Further, the target object display determination section 58 of the present embodiment has the function of showing a region displayed on top of the distance information display section 72. Particularly, this region is displayed in the semitransparent manner (semitransparent region 72C) such that the map information reproducing the scenery is still visible in the captioned region. That is, resolved is a problem where the map information shown on the display 22 becomes partially invisible due to the distance information. Therefore, it is possible to correctly perceive the kind of a target object existing in the range displayed on top of the distance information.

As an other example of the present embodiment, the function of the display control unit 50 may be incorporated not into the control unit 12 built in the mobile terminal 10, but into an external center server that is electrically connected to the transceiver 24 of the mobile terminal 10 through the communication tool 38. In such case, the structure of the control unit 12 of each mobile terminal 10 can be kept to a minimum scale. Similarly, the map data memory section 34 and the reference location data memory section 36 may also be incorporated not into the mobile terminal 10, but into a center server.

Although the present embodiment employs the display control device for use in a golf course and the detailed description thereof has been made so far, the display control device as the invention of the present application can actually be used for a purpose other than that in a golf course. Specifically, by utilizing map data other than the map data of a golf course, an actual target object can be a destination of evacuation at the time of disaster, or a treasure at the time of playing a treasure hunt game. Further, the sequence of the processing procedures shown in FIG. 6 is merely an example. That is, other processing procedures may be employed as long as functions similar to those described above can be achieved.

When using the display control device of the present embodiment to play the treasure hunt game, the actual target object (treasure) may not be placed in a fixed location, but moved around with time. Here, in order to transfer the location of the actual target object to the mobile terminal 10, it is preferred that the treasure itself be equipped with a location detecting device such as a GPS receiver; and a communication tool for sending the positioning data to the mobile terminal 10. Every time the mobile terminal 10 obtains such positioning data, the location information of the actual target object will be saved to and updated in the reference location data memory section 36.

The embodiment of the present invention has been described so far. However, the present invention is not limited to the embodiment described above. In fact, various modifications can be made to such embodiment without departing from the gist of the present invention.

DESCRIPTION OF SYMBOLS

10 Mobile terminal
14 GPS receiving part (location detecting device)
16 direction sensor (direction detecting device)
18 Operating part
22 Display
50 Display control unit
52 Map information display determination section
56 Angular difference display determination section
58 Target object display determination section
66A Fixed line
66B Variable line
68 Coordinate position display section (coordinate point)
72 Distance information display section (distance information)

What is claimed:

1. A display control device for displaying on a display of a mobile terminal a map information reproducing a scenery, and displaying on top of said map information a coordinate point corresponding to a current location of said mobile terminal every time the current location of said mobile terminal is obtained from a location detecting device as positioning data, comprising:
  a map information display determination section for displaying said map information on said display in a fixed orientation;
  an angle display determination section for displaying on said display a first display section indicating an angle between
    a variable direction in which said mobile terminal is directed as a result of adjusting the orientation of the mobile terminal, and
    a fixed direction of said map information displayed on said display in an immovable manner, every time an angle of direction in which said mobile terminal is pointed is obtained from a direction detecting device as direction data; and a target object display determination section for displaying on said display a second display section indicating a direction from said mobile terminal to an actual target object in a manner such that the direction from said mobile terminal to the actual target object is shown, based on the angle of direction in which said mobile terminal is pointed, the current location of said mobile terminal and a location information of the actual target object, every time said direction data and said positioning data are obtained from said direction detecting device and said location detecting device respectively, wherein the second display section is displayed in a location other than the location of said first display section in a linear needle-like shape such that the second display section always points to a direction of the actual target object regardless of the orientation of the mobile terminal with the coordinate point being indicated as a starting point of the second display section.

2. The display control device according to claim 1, wherein the first display section, displayed by the angle display determination section, comprises:

a fixed line indicating the fixed direction of said map information; and a variable line indicating the variable direction of said mobile terminal, wherein said angle display determination section is configured to display an angle between the fixed line and the variable line.

3. The display control device according to claim 2, wherein said angle display determination section is configured to display a point of intersection between said fixed line and said variable line in a location other than said coordinate point.

4. The display control device according to claim 3, wherein said angle display determination section is configured to display said fixed line in a manner such that said fixed line is parallel to a side edge of said display formed into a rectangular shape.

5. The display control device according to claim 1, wherein said target object display determination section is configured to display on said display a third display section indicating the direction to the actual target object; and an arc-like distance information indicating a given distance from said mobile terminal toward the actual target objet.

6. The display control device according to claim 1, wherein said target object display determination section is configured to allow the location information of the actual target object to be revised by operating an operating part.

7. The display control device according to claim 6, wherein said target object display determination section is configured to allow the location information of the actual target object to be revised by tapping said operating part provided on said display, when the variable direction and the fixed direction have matched with each other.

8. The display control device according to claim 5, wherein said target object display determination section is configured to allow the location information of the actual target object to be revised by operating an operating part.

* * * * *